United States Patent
Nebel et al.

(10) Patent No.: US 11,031,969 B2
(45) Date of Patent: *Jun. 8, 2021

(54) PROTECTIVE CASE FOR ELECTRONIC DEVICE

(71) Applicant: Otter Products, LLC, Fort Collins, CO (US)

(72) Inventors: David B. Nebel, Fort Collins, CO (US); Ross V. Bulkley, Loveland, CO (US); Alex S. Breeden, Fort Collins, CO (US); Matthew M. Glanzer, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,229

(22) Filed: Mar. 4, 2020

(65) Prior Publication Data
US 2020/0204205 A1 Jun. 25, 2020

Related U.S. Application Data

(63) Continuation of application No. 16/247,678, filed on Jan. 15, 2019, now Pat. No. 10,623,043.
(Continued)

(51) Int. Cl.
*H04B 1/3888* (2015.01)
*H04M 1/02* (2006.01)
(Continued)

(52) U.S. Cl.
CPC ............ *H04B 1/3888* (2013.01); *A45C 11/00* (2013.01); *A45C 13/36* (2013.01); *H04M 1/0283* (2013.01);
(Continued)

(58) Field of Classification Search
CPC .................. A45C 2011/002; A45F 2200/0516
(Continued)

(56) References Cited

U.S. PATENT DOCUMENTS 3,023,885 A   3/1962   Kindseth
3,480,310 A   11/1969  Mcelwain
(Continued)

FOREIGN PATENT DOCUMENTS

CN   202488509 U   10/2012
FR      935529 A    6/1948
(Continued)

OTHER PUBLICATIONS outfityours.com (Top 5 Best Clear iPhone 5S and iPhone 5 Cases—Incase, Otterbox, Griffin, Moshi [retrieved from https://www.youtube.com/watch?v=rWYKJvsDHPw],YouTube.com [online], May 17, 2013 [retrieved Oct. 11, 2017}, 3 pages.
(Continued)

*Primary Examiner* — Kiet M Doan

(57) ABSTRACT

A protective case for use with an electronic device includes a case portion configured to cover a back and sides of the electronic device when the electronic device is installed in the protective case. The case portion defines an aperture for directly accessing a front of the installed electronic device. The aperture has dimensions greater than or equal to corresponding dimensions of the electronic device. The case portion includes a first fastener material permanently attached to an inside back surface of the case portion. The protective case also includes a second fastener material configured to be permanently attached to the back of the electronic device at a location configured to align with the first fastener material when the electronic device is installed in the protective case. The second fastener material is
(Continued)

configured to removably adhere to the first fastener material to removably retain the electronic device in the case portion.

20 Claims, 16 Drawing Sheets

Related U.S. Application Data

(60) Provisional application No. 62/620,714, filed on Jan. 23, 2018.

(51) Int. Cl.
- *A45C 11/00* (2006.01)
- *A45C 13/36* (2006.01)
- *H04M 1/18* (2006.01)

(52) U.S. Cl.
CPC ....... *H04M 1/185* (2013.01); *A45C 2011/002* (2013.01); *A45F 2200/0516* (2013.01)

(58) Field of Classification Search
USPC .................................................. 455/575.8
See application file for complete search history.

(56) References Cited

U.S. PATENT DOCUMENTS

| | | |
|---|---|---|
| 3,521,216 A | 7/1970 | Tolegian |
| 3,786,391 A | 1/1974 | Mathauser |
| 3,808,577 A | 4/1974 | Mathauser |
| 3,810,258 A | 5/1974 | Mathauser |
| 3,816,679 A | 6/1974 | Hotchkiss |
| 4,029,999 A | 6/1977 | Neumann et al. |
| 4,097,878 A | 6/1978 | Cramer |
| 4,182,558 A | 1/1980 | Matsuo |
| 4,431,333 A | 2/1984 | Chandler |
| 4,584,718 A | 4/1986 | Fuller |
| 4,856,658 A | 8/1989 | Novak |
| 4,859,110 A | 8/1989 | Dommel |
| 4,925,146 A | 5/1990 | Hegarty |
| 4,933,988 A | 6/1990 | Thibault |
| 4,940,414 A | 7/1990 | Lee |
| 4,963,902 A | 10/1990 | Fukahori |
| 4,981,243 A | 1/1991 | Rogowski |
| 4,994,829 A | 2/1991 | Tsukamoto |
| 5,025,921 A | 6/1991 | Gasparaitis et al. |
| 5,054,733 A | 10/1991 | Shields |
| 5,123,044 A | 6/1992 | Tate |
| 5,138,523 A | 8/1992 | Benck et al. |
| 5,359,756 A | 11/1994 | Miyauchi et al. |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| D365,927 S | 1/1996 | Cho |
| 5,508,479 A | 4/1996 | Schooley |
| 5,541,813 A | 7/1996 | Satoh et al. |
| 5,604,050 A | 2/1997 | Brunette et al. |
| 5,664,292 A | 9/1997 | Chen |
| 5,671,120 A | 9/1997 | Kikinisi |
| 5,992,807 A | 11/1999 | Tarulli |
| 5,996,956 A | 12/1999 | Shawver |
| 6,097,593 A | 8/2000 | Faranda et al. |
| 6,115,248 A | 9/2000 | Canova et al. |
| 6,135,408 A | 10/2000 | Richter |
| 6,149,116 A | 11/2000 | Won |
| 6,151,206 A | 11/2000 | Kato et al. |
| 6,302,617 B1 | 10/2001 | Rumpp |
| 6,305,588 B1 | 10/2001 | Michel et al. |
| 6,305,656 B1 | 10/2001 | Wemyss |
| 6,311,017 B1 | 10/2001 | Mori |
| 6,317,313 B1 | 11/2001 | Mosgrove et al. |
| 6,349,824 B1 | 2/2002 | Yamada |
| 6,375,009 B1 | 4/2002 | Lee |
| 6,409,531 B1 | 6/2002 | Millard |
| 6,445,577 B1 | 9/2002 | Madsen et al. |
| 6,456,487 B1 | 9/2002 | Hetterick |
| 6,464,524 B1 | 10/2002 | Kerr et al. |
| 6,490,155 B2 | 12/2002 | Han et al. |
| 6,514,624 B2 | 2/2003 | Takemoto |
| 6,545,862 B1 | 4/2003 | Gettemy et al. |
| 6,616,111 B1 | 9/2003 | White |
| 6,625,394 B2 | 9/2003 | Smith et al. |
| 6,626,362 B1 | 9/2003 | Steiner et al. |
| 6,646,864 B2 | 11/2003 | Richardson |
| 6,685,493 B2 | 2/2004 | Birkenmaier et al. |
| 6,701,159 B1 | 3/2004 | Powell |
| 6,705,580 B1 | 3/2004 | Bain |
| 6,762,935 B2 | 7/2004 | Hidewasa |
| 6,865,076 B2 | 3/2005 | Lunsford |
| 6,888,940 B1 | 5/2005 | Deppen |
| 6,966,519 B2 | 11/2005 | Salentine et al. |
| 7,050,841 B1 | 5/2006 | Onda |
| 7,072,699 B2 | 7/2006 | Eiden |
| D526,780 S | 8/2006 | Richardson et al. |
| 7,145,767 B2 | 12/2006 | Mache et al. |
| 7,158,376 B2 | 1/2007 | Richardson et al. |
| 7,180,735 B2 | 2/2007 | Thomas et al. |
| 7,194,291 B2 | 3/2007 | Peng |
| D542,524 S | 5/2007 | Richardson et al. |
| 7,230,823 B2 | 6/2007 | Richardson et al. |
| 7,236,588 B2 | 6/2007 | Gartrell |
| 7,287,738 B2 | 10/2007 | Pitlor |
| 7,311,526 B2 | 12/2007 | Rohrbach et al. |
| 7,343,184 B2 | 3/2008 | Rostami |
| 7,359,184 B2 | 4/2008 | Lord |
| 7,374,142 B2 | 5/2008 | Carnevali |
| D574,819 S | 8/2008 | Andre et al. |
| 7,431,251 B2 | 10/2008 | Carnevali |
| D581,155 S | 11/2008 | Richardson et al. |
| D581,421 S | 11/2008 | Richardson et al. |
| D587,008 S | 2/2009 | Richardson et al. |
| D589,016 S | 3/2009 | Richardson et al. |
| 7,555,325 B2 | 6/2009 | Goros |
| 7,558,594 B2 | 7/2009 | Wilson |
| 7,575,389 B2 | 8/2009 | Nance |
| 7,688,580 B2 | 3/2010 | Richardson et al. |
| 7,845,608 B1 | 12/2010 | Chen et al. |
| 7,871,218 B2 | 1/2011 | Frey et al. |
| 7,889,489 B2 | 2/2011 | Richardson et al. |
| 7,907,394 B2 | 3/2011 | Richardson et al. |
| 7,933,122 B2 | 4/2011 | Richardson et al. |
| 8,016,107 B2 | 9/2011 | Emsky |
| 8,049,727 B2 | 11/2011 | Hanson et al. |
| 8,204,561 B2 | 6/2012 | Mongan et al. |
| 8,303,336 B2 | 11/2012 | Smith |
| 8,442,604 B1 | 5/2013 | Diebel |
| 8,453,344 B2 | 6/2013 | Nishiwaki et al. |
| 8,453,835 B2 | 6/2013 | So |
| 8,457,701 B2 | 6/2013 | Diebel |
| 8,490,783 B1 | 7/2013 | Fan |
| 8,509,865 B1 | 8/2013 | LaColla et al. |
| 8,514,568 B2 | 8/2013 | Qiao et al. |
| 8,567,599 B2 | 10/2013 | Beatty et al. |
| 8,599,547 B2 | 12/2013 | Richardson et al. |
| 8,608,502 B2 | 12/2013 | Witter et al. |
| 8,646,739 B2 | 2/2014 | Moyer |
| 8,676,281 B1 | 3/2014 | Caulder et al. |
| 8,706,175 B2 | 4/2014 | Cho |
| 8,755,852 B2 | 6/2014 | Hynecek et al. |
| 8,770,402 B2 | 7/2014 | Bergreen et al. |
| 8,777,002 B2 | 7/2014 | Thomas et al. |
| 8,798,675 B2 | 8/2014 | Salmon et al. |
| 8,800,762 B2 | 8/2014 | Fathollahi |
| 8,830,663 B2 | 9/2014 | Child et al. |
| 8,875,879 B2 | 11/2014 | Diebel et al. |
| D722,603 S | 2/2015 | Lay et al. |
| 8,955,678 B2 | 2/2015 | Murphy et al. |
| 8,965,458 B2 | 2/2015 | Richardson et al. |
| D725,119 S | 3/2015 | Gaylord |
| D726,732 S | 4/2015 | Lay et al. |

(56) References Cited

U.S. PATENT DOCUMENTS

| | | |
|---|---|---|
| 9,008,738 B1 | 4/2015 | Dong |
| 9,060,580 B2 | 6/2015 | Tages |
| 9,089,056 B2 | 7/2015 | Rayner |
| 9,098,238 B2 | 8/2015 | Richardson et al. |
| D739,857 S | 9/2015 | Lay et al. |
| 9,125,297 B2 | 9/2015 | Magness |
| 9,136,897 B2 | 9/2015 | Hynecek et al. |
| 9,153,112 B1 | 10/2015 | Kiani et al. |
| 9,226,057 B1 | 12/2015 | Davis et al. |
| 9,266,664 B2 | 2/2016 | Bau |
| 9,274,556 B2 | 3/2016 | Gallouzi et al. |
| 9,295,174 B2 | 3/2016 | Witter et al. |
| 9,316,026 B2 | 4/2016 | Myers et al. |
| 9,377,154 B2 | 6/2016 | Hung et al. |
| D762,258 S | 7/2016 | Jenkins |
| 9,397,719 B1 | 7/2016 | Schmidt |
| 9,408,448 B2 | 8/2016 | Kay et al. |
| D766,226 S | 9/2016 | Wu |
| D766,227 S | 9/2016 | Wu |
| D769,855 S | 10/2016 | Deng |
| 9,462,099 B2 | 10/2016 | Wilson et al. |
| 9,481,490 B2 | 11/2016 | Venida et al. |
| 9,487,376 B2 | 11/2016 | Salentine et al. |
| 9,503,147 B2 | 11/2016 | Witter et al. |
| D775,115 S | 12/2016 | Ormsbee et al. |
| 9,537,526 B2 | 1/2017 | Wilson et al. |
| 9,545,140 B1 | 1/2017 | Johnson et al. |
| 9,615,476 B2 | 4/2017 | Rayner et al. |
| 9,622,556 B2 | 4/2017 | Fathollahi et al. |
| 9,654,605 B2 | 5/2017 | Goldfain et al. |
| 9,660,684 B2 | 5/2017 | Rayner |
| 9,743,540 B2 | 8/2017 | Magness |
| 9,765,921 B2 | 9/2017 | Vogel et al. |
| 9,774,713 B2 | 9/2017 | Guerdrum et al. |
| D799,469 S | 10/2017 | Esses |
| 9,788,620 B1 | 10/2017 | Parkinson |
| 9,800,283 B2 | 10/2017 | Schmidt |
| 9,807,211 B2 | 10/2017 | Guerdrum et al. |
| 9,851,758 B2 | 12/2017 | Rowley |
| D808,376 S | 1/2018 | Kim |
| D808,377 S | 1/2018 | Witter et al. |
| 9,871,550 B2 | 1/2018 | Witter et al. |
| 9,913,388 B1 | 3/2018 | Mchatet |
| D824,376 S | 7/2018 | Lee |
| 10,027,783 B2 | 7/2018 | Dukerschein et al. |
| 10,058,155 B2 | 8/2018 | Guerdrum et al. |
| D827,627 S | 9/2018 | Lee |
| D829,700 S | 10/2018 | Kim |
| 10,103,769 B2 | 10/2018 | Witter et al. |
| 10,136,716 B2 | 11/2018 | Northrup et al. |
| 10,178,903 B2 | 1/2019 | Guerdrum et al. |
| 10,206,472 B1 | 2/2019 | Northrup et al. |
| 2001/0000617 A1 | 5/2001 | Tracy |
| 2001/0054594 A1 | 12/2001 | Maier-Hunke |
| 2002/0065054 A1 | 5/2002 | Humphreys et al. |
| 2002/0079244 A1 | 6/2002 | Kwong |
| 2003/0141329 A1 | 7/2003 | Huang |
| 2004/0029405 A1 | 2/2004 | Neidlein |
| 2004/0150945 A1 | 8/2004 | Mache et al. |
| 2005/0088811 A1 | 4/2005 | Ulla et al. |
| 2005/0213298 A1 | 9/2005 | Doherty et al. |
| 2005/0224508 A1 | 10/2005 | Tajiri et al. |
| 2005/0279661 A1 | 12/2005 | Hodges |
| 2005/0284904 A1 | 12/2005 | Knapp et al. |
| 2006/0027718 A1 | 2/2006 | Quijano et al. |
| 2006/0066438 A1 | 3/2006 | Altounian et al. |
| 2006/0086873 A1 | 4/2006 | Chen |
| 2006/0172765 A1 | 8/2006 | Lev |
| 2006/0237495 A1 | 10/2006 | Chen et al. |
| 2006/0243679 A1 | 11/2006 | Dickerson |
| 2006/0255493 A1 | 11/2006 | Fouladpour |
| 2007/0071423 A1 | 3/2007 | Fantone et al. |
| 2007/0115387 A1 | 5/2007 | Ho |
| 2007/0146985 A1 | 6/2007 | Mick et al. |
| 2007/0155448 A1 | 7/2007 | Hong |
| 2007/0158220 A1 | 7/2007 | Cleereman et al. |
| 2007/0215659 A1 | 9/2007 | Knapp et al. |
| 2007/0215769 A1 | 9/2007 | Nebeker et al. |
| 2007/0297149 A1 | 12/2007 | Richardson et al. |
| 2008/0117578 A1 | 5/2008 | Moscovitch |
| 2008/0163463 A1 | 7/2008 | Hulden |
| 2008/0199252 A1 | 8/2008 | Frey et al. |
| 2008/0304692 A1 | 12/2008 | Zhang |
| 2009/0001232 A1 | 1/2009 | Seo et al. |
| 2009/0034169 A1 | 2/2009 | Richardson et al. |
| 2009/0079665 A1 | 3/2009 | Moscovitch |
| 2009/0084705 A1 | 4/2009 | Justiss |
| 2009/0161903 A1 | 6/2009 | White |
| 2009/0237377 A1 | 9/2009 | Lai et al. |
| 2009/0283184 A1 | 11/2009 | Han |
| 2010/0006468 A1 | 1/2010 | Lin |
| 2010/0078343 A1 | 4/2010 | Hoellwarth et al. |
| 2010/0090085 A1 | 4/2010 | Corrion |
| 2010/0093412 A1 | 4/2010 | Serra et al. |
| 2010/0122756 A1 | 5/2010 | Longinotti-Buitoni |
| 2010/0141864 A1 | 6/2010 | Lai |
| 2010/0147737 A1 | 6/2010 | Richardson et al. |
| 2010/0181450 A1 | 7/2010 | Hulick et al. |
| 2010/0195279 A1 | 8/2010 | Michael |
| 2010/0203931 A1 | 8/2010 | Hynecek et al. |
| 2010/0215188 A1 | 8/2010 | Wilcox |
| 2010/0230301 A1 | 9/2010 | Fellig |
| 2011/0031287 A1 | 2/2011 | Gette et al. |
| 2011/0064401 A1 | 3/2011 | DeSorbo |
| 2011/0073505 A1 | 3/2011 | Stiehl |
| 2011/0073608 A1 | 3/2011 | Richardson et al. |
| 2011/0075349 A1 | 3/2011 | Ma et al. |
| 2011/0101058 A1 | 5/2011 | Heckman |
| 2011/0170256 A1 | 7/2011 | Lee |
| 2011/0192857 A1 | 8/2011 | Rothbaum et al. |
| 2011/0216495 A1 | 9/2011 | Marx |
| 2011/0228459 A1 | 9/2011 | Richardson et al. |
| 2011/0235846 A1 | 9/2011 | Jiang et al. |
| 2011/0294556 A1 | 12/2011 | Carlberg et al. |
| 2011/0297566 A1 | 12/2011 | Gallagher et al. |
| 2011/0314651 A1 | 12/2011 | Behar et al. |
| 2012/0018325 A1 | 1/2012 | Kim |
| 2012/0031788 A1 | 2/2012 | Mongan et al. |
| 2012/0037524 A1 | 2/2012 | Thomas et al. |
| 2012/0037536 A1 | 2/2012 | Thomas et al. |
| 2012/0043235 A1 | 2/2012 | Klement |
| 2012/0074005 A1 | 3/2012 | Johnson et al. |
| 2012/0092377 A1 | 4/2012 | Stein |
| 2012/0106069 A1 | 5/2012 | Strauser |
| 2012/0111881 A1 | 5/2012 | Gaddis et al. |
| 2012/0170194 A1 | 7/2012 | Lord et al. |
| 2012/0175474 A1 | 7/2012 | Barnard et al. |
| 2012/0187260 A1 | 7/2012 | Moyer |
| 2012/0252543 A1 | 10/2012 | Cho |
| 2012/0267491 A1 | 10/2012 | Chiu |
| 2012/0287565 A1 | 11/2012 | Bennett |
| 2012/0325702 A1 | 12/2012 | Gallagher et al. |
| 2012/0326003 A1 | 12/2012 | Solow et al. |
| 2013/0027862 A1 | 1/2013 | Rayner |
| 2013/0039521 A1 | 2/2013 | Zhou et al. |
| 2013/0068915 A1 | 3/2013 | Yang |
| 2013/0083953 A1 | 4/2013 | Chang |
| 2013/0088813 A1 | 4/2013 | Su et al. |
| 2013/0098788 A1 | 4/2013 | McCarville et al. |
| 2013/0107449 A1 | 5/2013 | Su et al. |
| 2013/0109253 A1 | 5/2013 | Gammon et al. |
| 2013/0117487 A1 | 5/2013 | Leung |
| 2013/0126533 A1 | 5/2013 | Klosky |
| 2013/0175186 A1 | 7/2013 | Simmer |
| 2013/0177181 A1 | 7/2013 | Marcus |
| 2013/0181584 A1 | 7/2013 | Whitten et al. |
| 2013/0220841 A1 | 8/2013 | Yang |
| 2013/0220847 A1 | 8/2013 | Fisher et al. |
| 2013/0222989 A1 | 8/2013 | Chen |
| 2013/0230202 A1 | 9/2013 | Widner et al. |
| 2013/0240578 A1 | 9/2013 | Yu |
| 2013/0262248 A1 | 10/2013 | Kim et al. |
| 2013/0292269 A1 | 11/2013 | Tages |
| 2013/0292288 A1 | 11/2013 | Willes |

(56) References Cited

U.S. PATENT DOCUMENTS

| | | |
|---|---|---|
| 2013/0303000 A1 | 11/2013 | Witter et al. |
| 2013/0318775 A1 | 12/2013 | Peters |
| 2014/0003647 A1 | 1/2014 | Liu |
| 2014/0049142 A1 | 2/2014 | Magness |
| 2014/0065847 A1 | 3/2014 | Salmon et al. |
| 2014/0080553 A1 | 3/2014 | Torset et al. |
| 2014/0097102 A1 | 4/2014 | Piatt et al. |
| 2014/0099526 A1 | 4/2014 | Powell et al. |
| 2014/0128132 A1 | 5/2014 | Cox |
| 2014/0141838 A1 | 5/2014 | Cai et al. |
| 2014/0152890 A1 | 6/2014 | Rayner |
| 2014/0166707 A1 | 6/2014 | Leisey-Bartsch |
| 2014/0168884 A1 | 6/2014 | Wylie |
| 2014/0183064 A1 | 7/2014 | Ge |
| 2014/0183065 A1 | 7/2014 | Toulotte |
| 2014/0187289 A1 | 7/2014 | Cataldo et al. |
| 2014/0200056 A1 | 7/2014 | Liu |
| 2014/0227026 A1 | 8/2014 | O'Neill et al. |
| 2014/0228074 A1 | 8/2014 | Kulkarni et al. |
| 2014/0262848 A1 | 9/2014 | Fathollahi et al. |
| 2014/0262934 A1 | 9/2014 | Fathollahi et al. |
| 2014/0265765 A1 | 9/2014 | Khodapanah et al. |
| 2014/0265767 A1 | 9/2014 | Fathollahi |
| 2014/0299488 A1 | 10/2014 | Andrew |
| 2014/0302896 A1 | 10/2014 | Xu et al. |
| 2014/0325818 A1 | 11/2014 | Mayfield |
| 2014/0355200 A1 | 12/2014 | Thiers |
| 2014/0375877 A1 | 12/2014 | Tages et al. |
| 2015/0061477 A1 | 3/2015 | Wilson |
| 2015/0062787 A1 | 3/2015 | Wilson et al. |
| 2015/0068935 A1 | 3/2015 | Kay et al. |
| 2015/0083615 A1 | 3/2015 | Lay et al. |
| 2015/0111623 A1 | 4/2015 | Hegemier et al. |
| 2015/0133183 A1 | 5/2015 | Alameh et al. |
| 2015/0141090 A1 | 5/2015 | Hwan et al. |
| 2015/0141095 A1 | 5/2015 | Kim |
| 2015/0153791 A1 | 6/2015 | Wong |
| 2015/0172431 A1 | 6/2015 | Huang |
| 2015/0189160 A1 | 7/2015 | Auger et al. |
| 2015/0194997 A1 | 7/2015 | Johnson et al. |
| 2015/0194998 A1 | 7/2015 | Fathollahi |
| 2015/0195938 A1 | 7/2015 | Witter et al. |
| 2015/0201723 A1 | 7/2015 | Rayner et al. |
| 2015/0214989 A1 | 7/2015 | Yeh et al. |
| 2015/0220766 A1 | 8/2015 | Russell et al. |
| 2015/0257285 A1 | 9/2015 | Wilson et al. |
| 2015/0257287 A1 | 9/2015 | Tages |
| 2015/0304466 A1 | 10/2015 | Tamatsu |
| 2016/0007705 A1 | 1/2016 | Liebers et al. |
| 2016/0036478 A1 | 2/2016 | Wong |
| 2016/0040825 A1 | 2/2016 | Franklin |
| 2016/0072933 A1 | 3/2016 | Cox |
| 2016/0080024 A1 | 3/2016 | Wilson et al. |
| 2016/0122821 A1 | 5/2016 | Liu et al. |
| 2016/0142093 A1 | 5/2016 | Phang |
| 2016/0150861 A1 | 6/2016 | Yao et al. |
| 2016/0164565 A1 | 6/2016 | Witter et al. |
| 2016/0179143 A1 | 6/2016 | Bidwell et al. |
| 2016/0183392 A1 | 6/2016 | Kelley |
| 2016/0195898 A1 | 7/2016 | Lau |
| 2016/0198822 A1 | 7/2016 | Lee et al. |
| 2016/0254836 A1* | 9/2016 | Alsberg ............. A45C 11/00 455/575.8 |
| 2016/0261133 A1 | 9/2016 | Wang |
| 2016/0282905 A1 | 9/2016 | Laine et al. |
| 2016/0286920 A1 | 10/2016 | Lean et al. |
| 2016/0286921 A1 | 10/2016 | Northrup et al. |
| 2016/0295981 A1 | 10/2016 | Lay et al. |
| 2016/0347257 A1 | 12/2016 | Buchanan |
| 2017/0026498 A1 | 1/2017 | Goldfain et al. |
| 2017/0041037 A1 | 2/2017 | Witter et al. |
| 2017/0099922 A1 | 4/2017 | Guerdrum et al. |
| 2017/0099924 A1 | 4/2017 | Fathollahi et al. |
| 2017/0119120 A1 | 5/2017 | Richardson et al. |
| 2017/0237460 A1 | 8/2017 | Rayner |
| 2017/0279478 A1 | 9/2017 | Fathollahi |
| 2017/0327054 A1 | 11/2017 | Yu et al. |
| 2017/0328517 A1 | 11/2017 | Wessels |
| 2017/0353208 A1 | 12/2017 | Wilson et al. |
| 2017/0359096 A1 | 12/2017 | Witter et al. |
| 2017/0360200 A1 | 12/2017 | Cohen |
| 2018/0136695 A1 | 5/2018 | Lo et al. |
| 2018/0167498 A1 | 6/2018 | Drakos |
| 2018/0369599 A1 | 12/2018 | Smith |
| 2019/0094853 A1 | 3/2019 | Overall |
| 2019/0141848 A1 | 5/2019 | Sung |
| 2019/0211966 A1 | 7/2019 | Nahum et al. |
| 2019/0212774 A1 | 7/2019 | Patterson et al. |
| 2019/0222682 A1 | 7/2019 | Ren et al. |
| 2019/0250664 A1 | 8/2019 | Eslava et al. |
| 2019/0281147 A1 | 9/2019 | Sherburne et al. |
| 2019/0286191 A1 | 9/2019 | Correll, Jr. |

FOREIGN PATENT DOCUMENTS

| | | |
|---|---|---|
| KR | 200446444 | 10/2009 |
| KR | 101394285 | 5/2014 |
| WO | 1994000037 A1 | 1/1994 |
| WO | 1999041958 A1 | 8/1999 |
| WO | 2015103599 A1 | 7/2015 |

OTHER PUBLICATIONS

Randomrazr (New Otterbox Symmetry Case—The Slim Protective Case for the iPhone 5S/5C [retrieved from https://wwwyoutube.com/watch?v=zGWZTGamuT0],YouTube.com [online], Mar. 30, 2014 [retrieved Oct. 11, 2017]), 5 pages.

* cited by examiner

PROTECTIVE CASE FOR ELECTRONIC DEVICE

CROSS REFERENCE TO RELATED APPLICATIONS

This application claims priority to U.S. patent application Ser. No. 16/247,678, filed on Jan. 15, 2019, which claims priority to U.S. Provisional Patent Application No. 62/620,714, filed on Jan. 23, 2018, all of which are hereby incorporated by reference in their entirety.

FIELD

The present disclosure relates to cases, covers, and/or encasements for use with electronic devices.

BACKGROUND

Portable electronic devices are commonly used for communication and entertainment purposes. Portable electronic devices include devices such as smartphones, cellular phones, mobile communication devices, computers, portable computing devices, mobile computing devices, tablet computers, cameras, video players, smart watches, audio players, electronic media readers, two-way radios, global positioning satellite (GPS) devices, measurement instruments, and/or other types of electronic, computing, or communication devices, including combinations thereof. Cases, protective cases, covers, protective covers, enclosures, or encasements are sometimes installed on or over housings of these types of electronic devices in order to protect the electronic devices from damage due to exposure to shock, impact, dropping, puncture, dust, dirt, water, snow, rain, mud, chemicals, and/or other potentially damaging forces or elements. The term "case" is used herein to refer to any type of case, cover, protective case, protective cover, enclosure, encasement, shell, or combination thereof. Cases are also sometimes used to supplement the functionality of the device and/or to change the aesthetics of the device.

Over time, the sizes of display screens on electronic devices have increased. Bezels around the display screens on the fronts of electronic devices have grown smaller as the display screens have been extended closer to one or more edges of the electronic devices. The shrinking or absence of bezels makes it more difficult to keep protective cases attached to the electronic devices while still allowing access to the display screen. Improved systems, apparatuses, and methods which solve these and other problems are disclosed herein.

SUMMARY

In one example a protective case for use with an electronic device includes a first case portion having an attached first resilient compressible pad and a second case portion having an attached second resilient compressible pad. The second case portion is configured to be removably attachable to the first case portion such the attached first and second case portions at least partially cover the electronic device when the electronic device is installed in the protective case. The attached first and second case portions also define an aperture for directly accessing a front of the installed electronic device. The aperture has dimensions greater than or equal to corresponding dimensions of the electronic device. The first and second resilient compressible pads are each configured to be compressed by opposing sides of the installed electronic device when the second case portion is attached to the first case portion over, on, or around the electronic device. The first and second resilient compressible pads are further configured to apply opposing forces to the opposing sides of the installed electronic device, respectively, to retain the installed electronic device in the protective case.

In another example, a protective case for an electronic device includes a first case portion and a second case portion. The first case portion has a first compressible pad. The second case portion attaches to the first case portion and is adapted to at least partially cover the electronic device when the electronic device is installed in the protective case. The second case portion has a second compressible pad. The installed electronic device compresses the first compressible pad and the second compressible pad when the second case portion is attached to the first case portion. The compression of the first and second compressible pads is adapted to keep the installed electronic device from coming out of the protective case because of the lateral force the compressible pads exert on the sides of the electronic device.

In another example, a protective case for use with an electronic device includes a case portion configured to cover a back and sides of the electronic device when the electronic device is installed in the protective case. The case portion defines an aperture for directly accessing a front of the installed electronic device. The aperture has dimensions greater than or equal to corresponding dimensions of the electronic device. The case portion does not include a lip or edge that extends around a front edge of the installed electronic device. The case portion includes a first fastener material permanently attached to an inside back surface of the case portion. The protective case also includes a second fastener material configured to be permanently attached to the back of the electronic device at a location configured to align with the first fastener material of the case portion when the electronic device is installed in the protective case. The second fastener material is configured to removably adhere to the first fastener material to removably retain the electronic device in the case portion.

Various other embodiments and variations of the disclosed techniques and methods are possible. While multiple embodiments are disclosed, still other embodiments will become apparent to those skilled in the art from the following detailed description and figures, which describe and show illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

The present invention will be described and explained through the use of the accompanying drawings in which.

DETAILED DESCRIPTION

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Some of the cases described herein are described as protective cases. However, the apparatuses and techniques disclosed herein are not to be limited to any particular protective characteristic of the case and may be applicable to various types of cases, covers, and/or encasements which cover an electronic device either partially or fully and may not have any particular protective characteristic.

Figure 1A:
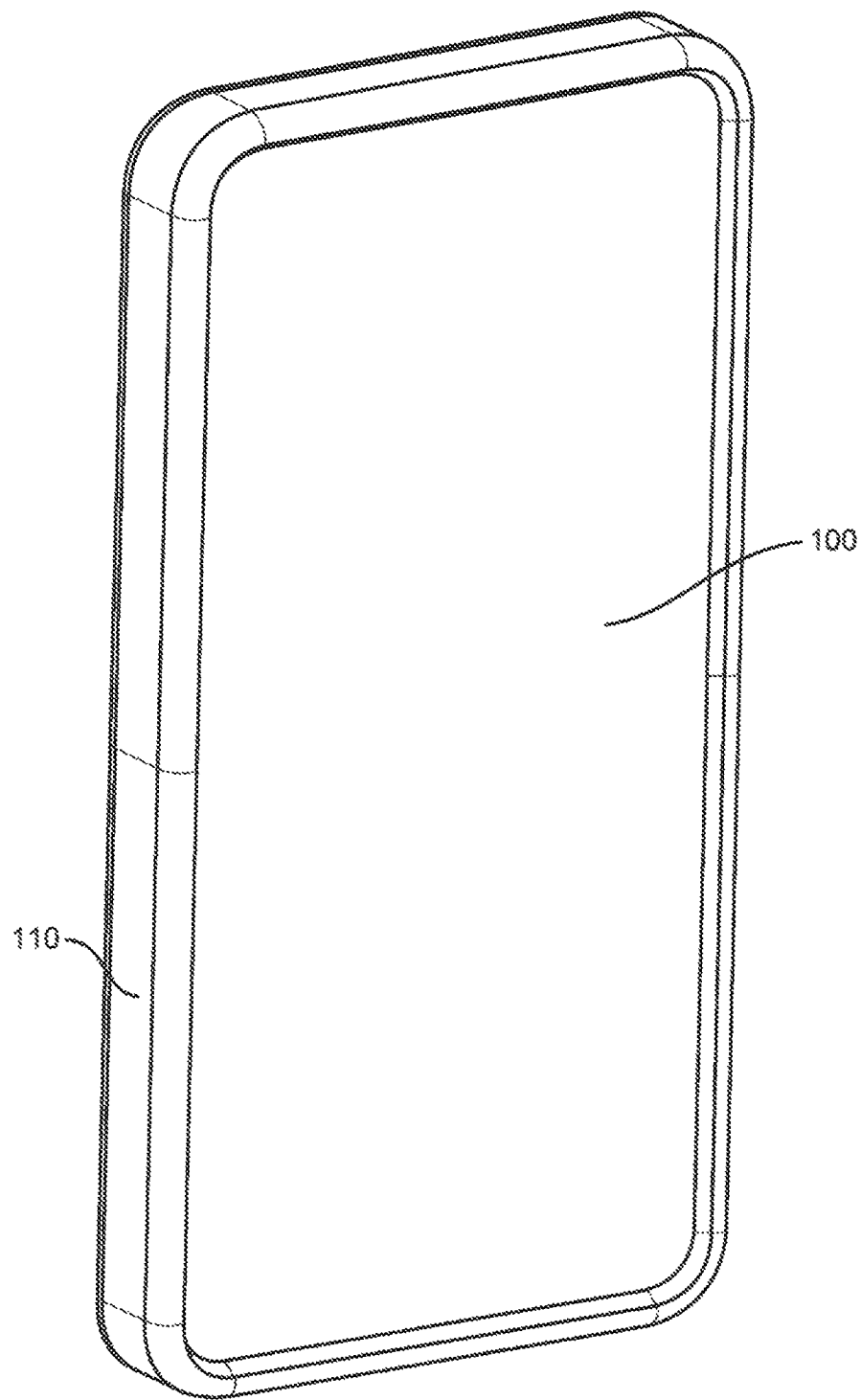
FIG. 1A illustrates an electronic device installed in a protective case.

FIG. 1A illustrates an electronic device 100 installed in a protective case 110. Electronic device 100 may be a cellular phone, smartphone, mobile communication device, mobile computing device, portable computing device, tablet, phablet (phone/tablet), portable computer, personal video player, electronic media reader, audio player, handheld scanner, camera, GPS device, or electronic computing or communication device of another type, including combinations thereof. In one specific example, electronic device 100 may be an APPLE IPHONE. In another specific example, electronic device 100 may be a SAMSUNG GALAXY phone.

Protective case 110 comprises any type of protective shell, cover, covering, enclosure, bumper, frame, sheath, encasement, member, and/or a combination thereof used with the electronic device 100. Protective case 110 may provide protection against forces or damaging elements such as shock, impact, dropping, puncture, dust, dirt, heat, cold, water, snow, rain, mud, fluids chemicals, and/or other potentially damaging elements. In various instances, as described in further detail below, protective case 110 may be waterproof, watertight, and/or water-resistant. In other examples, techniques disclosed herein may implemented in the form of a cover for electronic device 100 which provides some or all of the functions disclosed herein while having little or no protective characteristics.

Protective case 110 may include one member or portion, two members or portions, or more than two members or portions that attach to each other. Some of these members may be permanently attached to each other and some of these members may be removably attachable to each other for insertion and/or removal of electronic device 100 from protective case 110. In some situations, protective case 110 may be a one-piece case or a one-piece assembly into which electronic device 100 snaps or slides. In other situations, protective case 110 may contain multiple pieces that are assembled on, over, or around electronic device 100. In addition to an outer shell, protective case 110 may also include one or more cushion members, cushion layers, cushion liners, and/or cushion portions that are removably attached or permanently attached to any combination of the one, two, or more members. Any portion of protective case 110 may be made of any suitable material, including, but not limited to, polycarbonate (PC), high impact polystyrene (HIPS), nylon, fiberglass-filled nylon, acrylonitrile butadiene styrene (ABS), polyoxymethylene (POM), polyethylene terephthalate (PET), ceramic, metallized ceramic, aluminum, aluminum alloy, titanium, wood, carbon fiber, and/or any combination thereof. The techniques disclosed herein are not to be limited to any particular type, structure, or configuration of case.

Over time, the sizes of display screens on electronic devices have increased. Bezels around the front edges or perimeter of these electronic devices have also grown smaller as the display screens have been extended closer to one or more edges of the electronic device. The shrinking or absence of bezels makes it more difficult to keep protective cases attached to the electronic devices because there is minimal edge or lip for the case to grasp onto without blocking or obscuring the display. In the example of FIG. 1A, protective case 110 may not be able to wrap around a front edge of electronic device 100 to an extent necessary to keep electronic device 100 from falling out of protective case 110. In other words, electronic device 100 may not have enough of a non-display bezel area around one or more perimeter edges of its front surface for protective case 110 to 'grab' or hold onto. Therefore, without the improvements discussed herein, electronic device 100 may otherwise fall out of protective case 110 or easily dislodge from protective case 110 when protective case 110 is oriented or facing in a downward direction or is subject to impact.

In some examples, the front opening or aperture of protective case 110 may have dimensions that are similar to the corresponding dimensions of electronic device 100. In some configurations, the dimensions of the opening or aperture may be slightly less than the corresponding dimensions of electronic device 100. In other configurations, the dimensions of the opening or aperture may be substantially the same as the corresponding dimensions of electronic device 100. In yet other configurations, the dimensions of the opening or aperture may be slightly larger than the corresponding dimensions of electronic device 100.

Figure 1B:
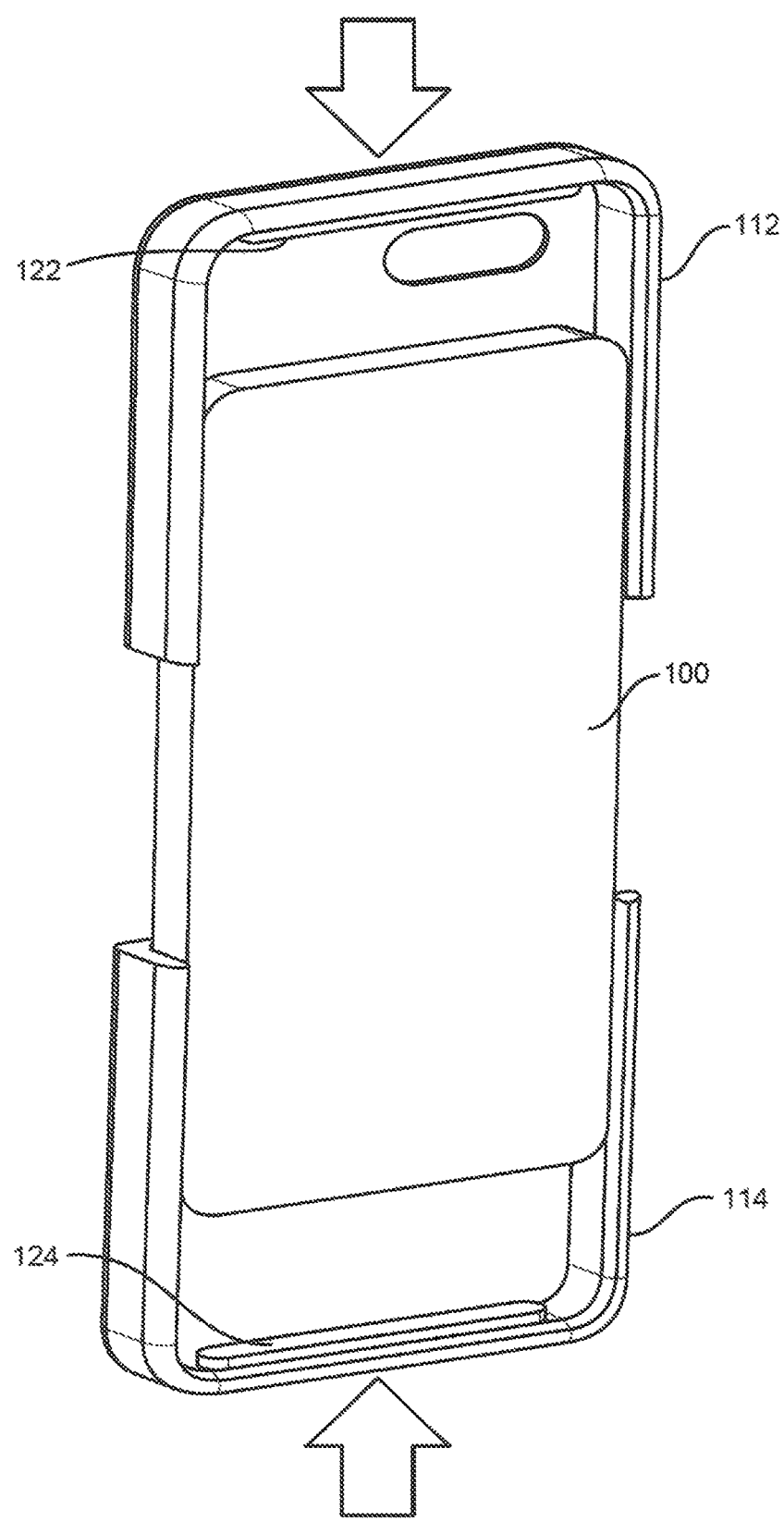
FIG. 1B illustrates the electronic device being installed in the protective case of FIG. 1A.

As illustrated in FIG. 1B, protective case 110 includes a first case portion 112 and a second case portion 114. First case portion 112 and second case portion 114 slide over opposing ends of electronic device 100 and snap together using a snap feature and/or other attachment mechanisms. In some examples, the snap feature may include an interference fit between two or more components. First case portion 112 includes a first pad 122 adhered or affixed to an interior wall of first case portion 112. Second case portion 114 includes a second pad 124 adhered or affixed to an interior wall of second case portion 114. First pad 122 and/or second pad 124 are compressible such that one or both are at least partially compressed when first case portion 112 is attached to second case portion 114 around or over the housing of electronic device 100. First pad 122 and/or second pad 124 are also resilient and/or elastic and tend to recover some or all of their original dimensions or shape when not compressed. First pad 122 and/or second pad 124 may be of any shape or dimensions. Further each of first case portion 112 and second case portion 114 may contain more than one compressible or resilient pad.

The internal dimensions of first case portion 112 and second case portion 114 correspond to one or more dimensions of electronic device 100 such that the case portions cannot be attached without at least partially compressing first pad 122 and/or second pad 124. Because first pad 122 and/or second pad 124 comprise a resilient material that recovers some or all of its shape when a compressive force is removed, first pad 122 and/or second pad 124 maintain a force applied against the ends of electronic device 100 while electronic device 100 is installed in protective case 110. First pad 122 and second pad 124 oppose each other such that they contact and apply opposing forces, respectively, to opposing sides of electronic device 100. In some examples, first pad 122 and second pad 124 exert force along an axis that is the same, or substantially the same, as the axis along which first case portion 112 and second case portion 114 are slidably attached to each other.

The force exerted by first pad 122 and/or second pad 124 tends to prevent or reduce the chances of sheer sliding of electronic device 100 thereby reducing the chances of electronic device 100 falling out of the front opening or aperture of protective case 110. In other words, the resilient force from first pad 122 and/or second pad 124 keeps electronic device 100 in protective case 110 even though protective case 110 has little or no lip that wraps around a front edge of electronic device 100. Beneficially, protective case 110 does not cover or obscure the display of electronic device 100 and the display remains visible and/or accessible. At the same time, electronic device 100 stays in place in protective case 110 despite orientation or possible impact. One or both of first case portion 112 and second case portion 114 may include one or more opening or apertures for accessing a camera, a flash, a button, a control feature, an electrical port, a speaker, a microphone, or some other element of installed electronic device 100 from outside the protective case.

Figure 1C:
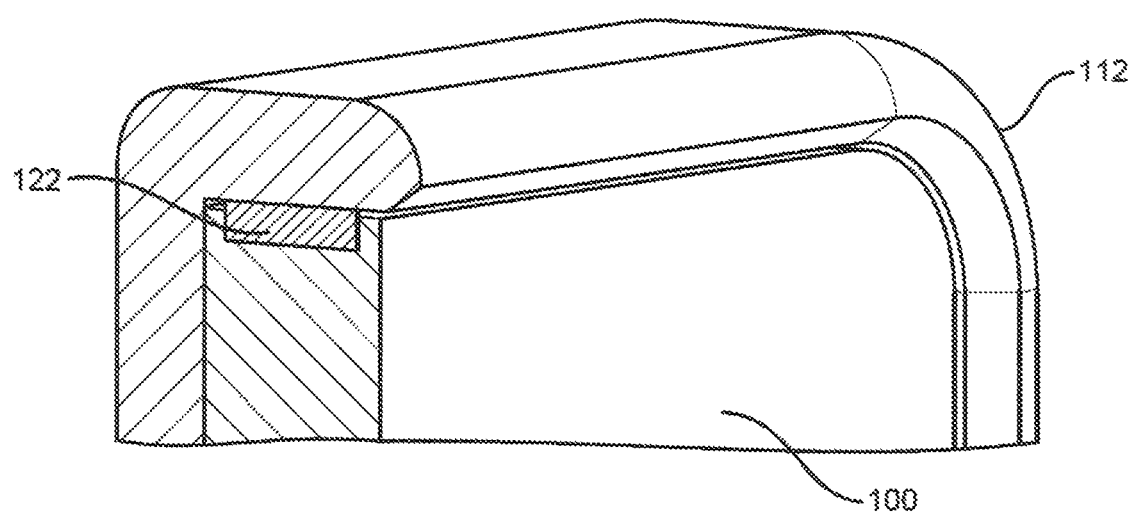
FIG. 1C illustrates a close-up cross-section view of a portion of the electronic device installed in the protective case of FIG. 1A.

FIG. 1C illustrates a close-up cross-section view of one corner of electronic device 100 installed in the protective case 110 with electronic device 100 pressed against first pad 122. In some examples, one or more sides of electronic device 100 may contain a slot or recess for receiving at least a portion of first pad 122, thereby improving the ability of the pads to keep the electronic device 100 inside protective case 110.

Figure 2A:
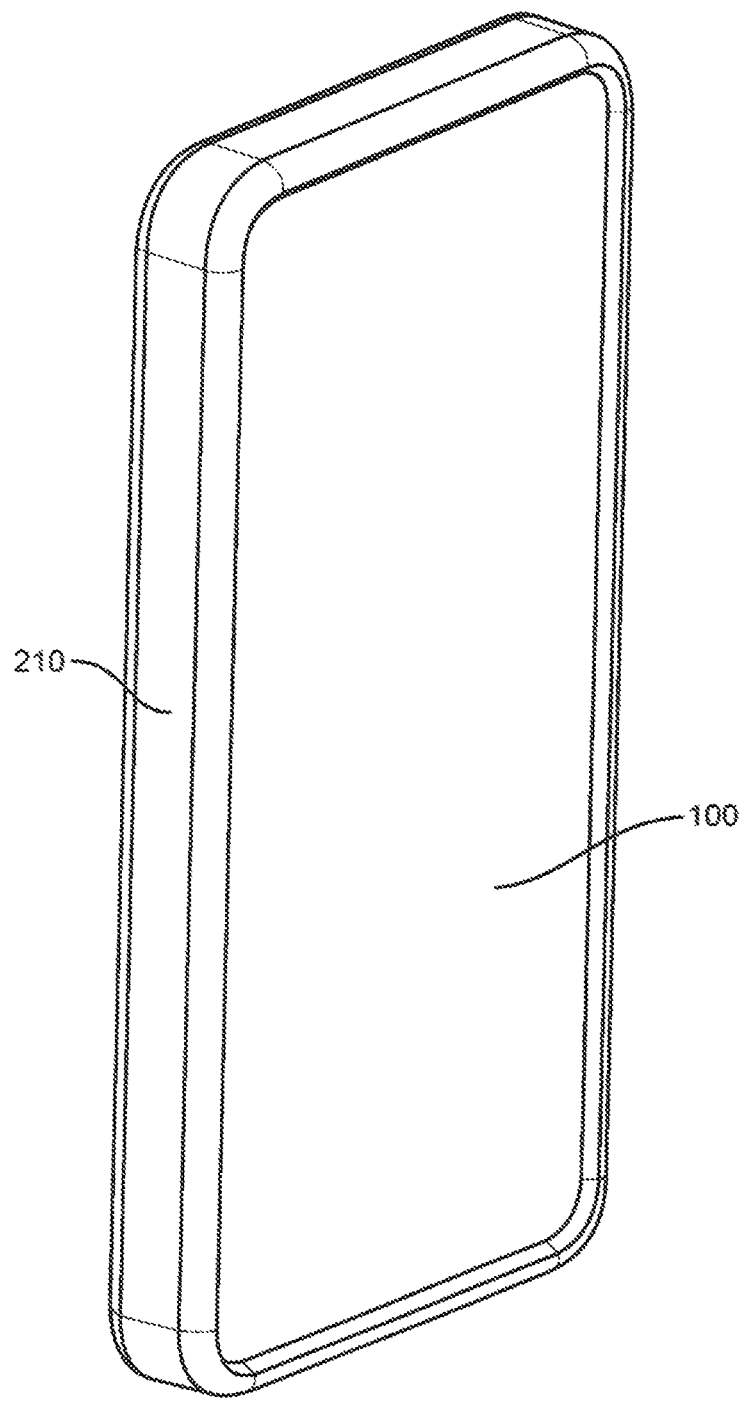
FIG. 2A illustrates the electronic device installed in a protective case.

FIG. 2A illustrates electronic device 100 installed in a protective case 210. Protective case 210 may have any of the features, functions, characteristics, or elements of protective case 110. Protective case 210 may include one member or portion, two members or portions, or more than two members or portions. Some of these members may be permanently attached to each other and some of these members may be removably attachable to each other for insertion and/or removal of electronic device 100 from protective case 210. Protective case 210 may also include one or more cushion members, cushion layers, and/or cushion portions that are removably attached or permanently attached to any combination of the one, two, or more members. Any portion of protective case 210 may be made of any suitable material, including, but not limited to, polycarbonate (PC), high impact polystyrene (HIPS), nylon, fiberglass-filled nylon, acrylonitrile butadiene styrene (ABS), polyoxymethylene (POM), polyethylene terephthalate (PET), ceramic, metalized ceramic, aluminum, aluminum alloy, titanium, wood, carbon fiber, and/or any combination thereof. The techniques disclosed herein are not to be limited to any particular type, structure, or configuration of case.

Figure 2B:
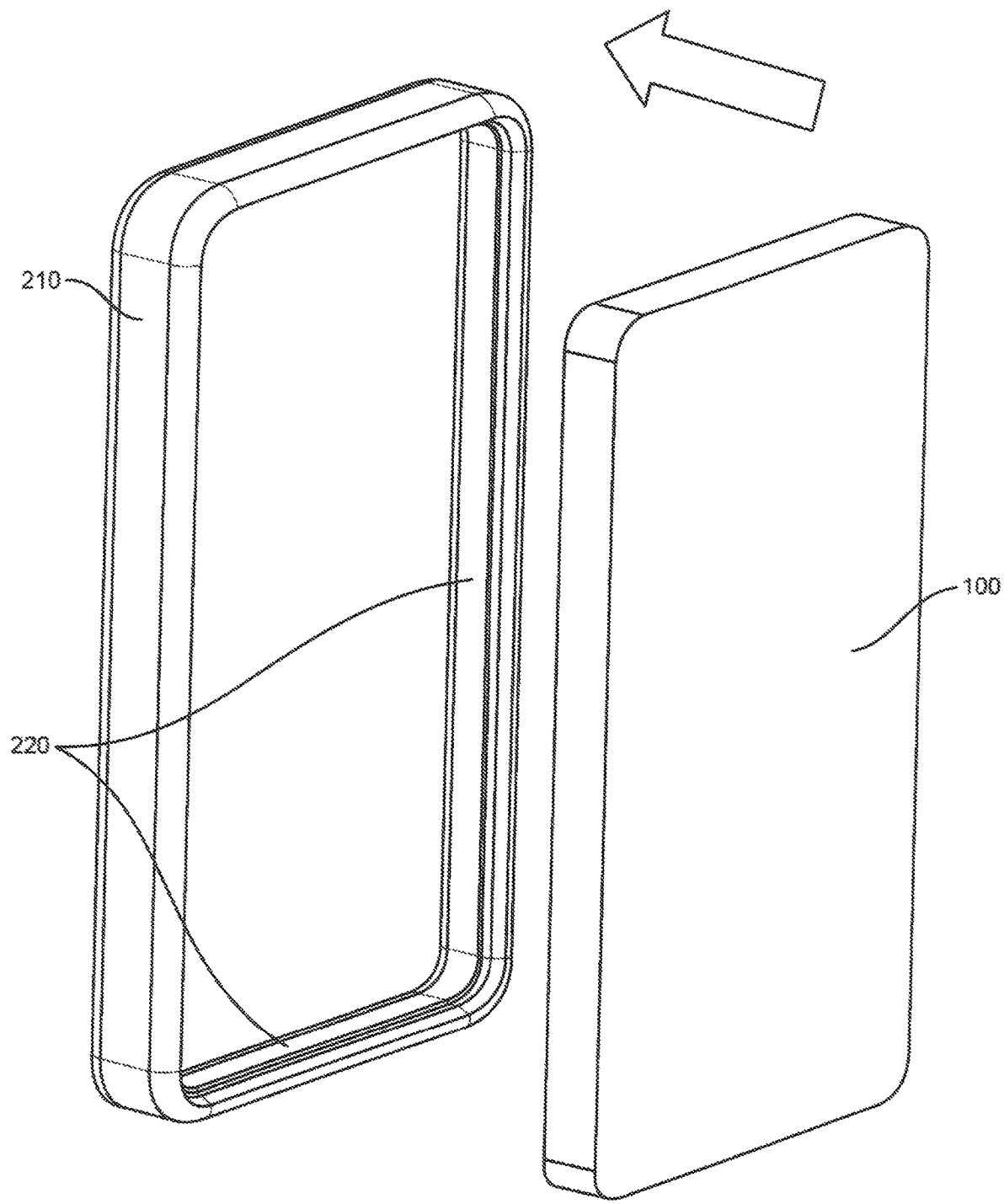
FIG. 2B illustrates the electronic device being installed in the protective case of FIG. 2A.
Figure 2C:
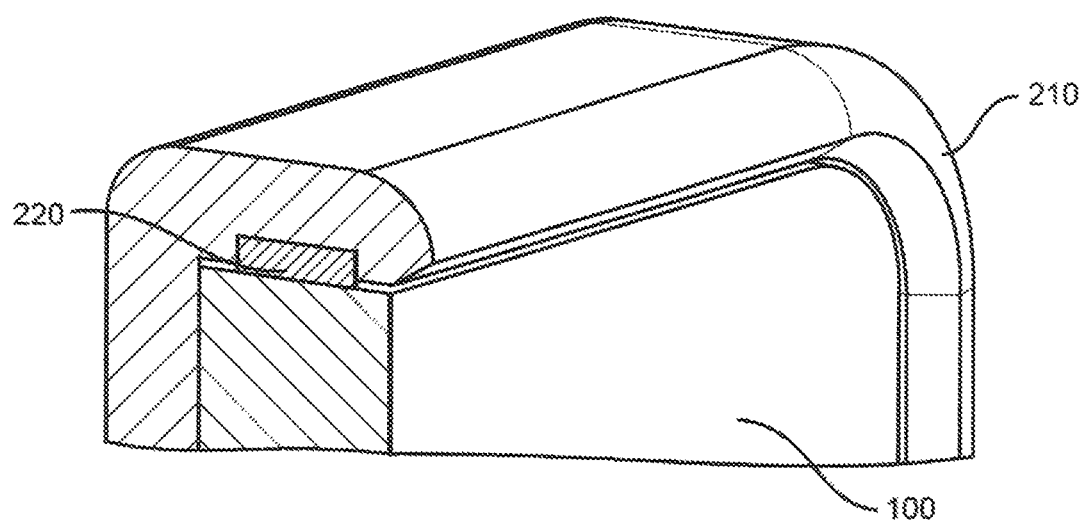
FIG. 2C illustrates a close-up cross-section view of a portion of the electronic device installed in the protective case of FIG. 2A.

As illustrated in FIG. 2B, protective case 210 includes one or more pieces of sheer reduction material 220 attached to one or more interior surfaces of walls of protective case 210. Sheer reduction material 220 may be a single piece of material or multiple pieces of material and may be present on any of the walls of protective case 210. Electronic device 100 is inserted into protective case 210 by pressing it into the front opening. Contact between one or more sides of electronic device 100 and sheer reduction material 220 tends to keep electronic device 100 from easily falling or sliding out of protective case 210 by preventing or reducing the possibility of sheer sliding of electronic device 100. Sheer reduction material 220 may be adhered to protective case 210 or may be molded or comolded into or onto protective case 210. Sheer reduction material 220 may sit above a surface of the wall of protective case 210 or may be placed or formed in a recess or channel as illustrated in FIG. 2C. Sheer reduction may also be achieved by applying a coating or surface treatment to another material.

Figure 3:
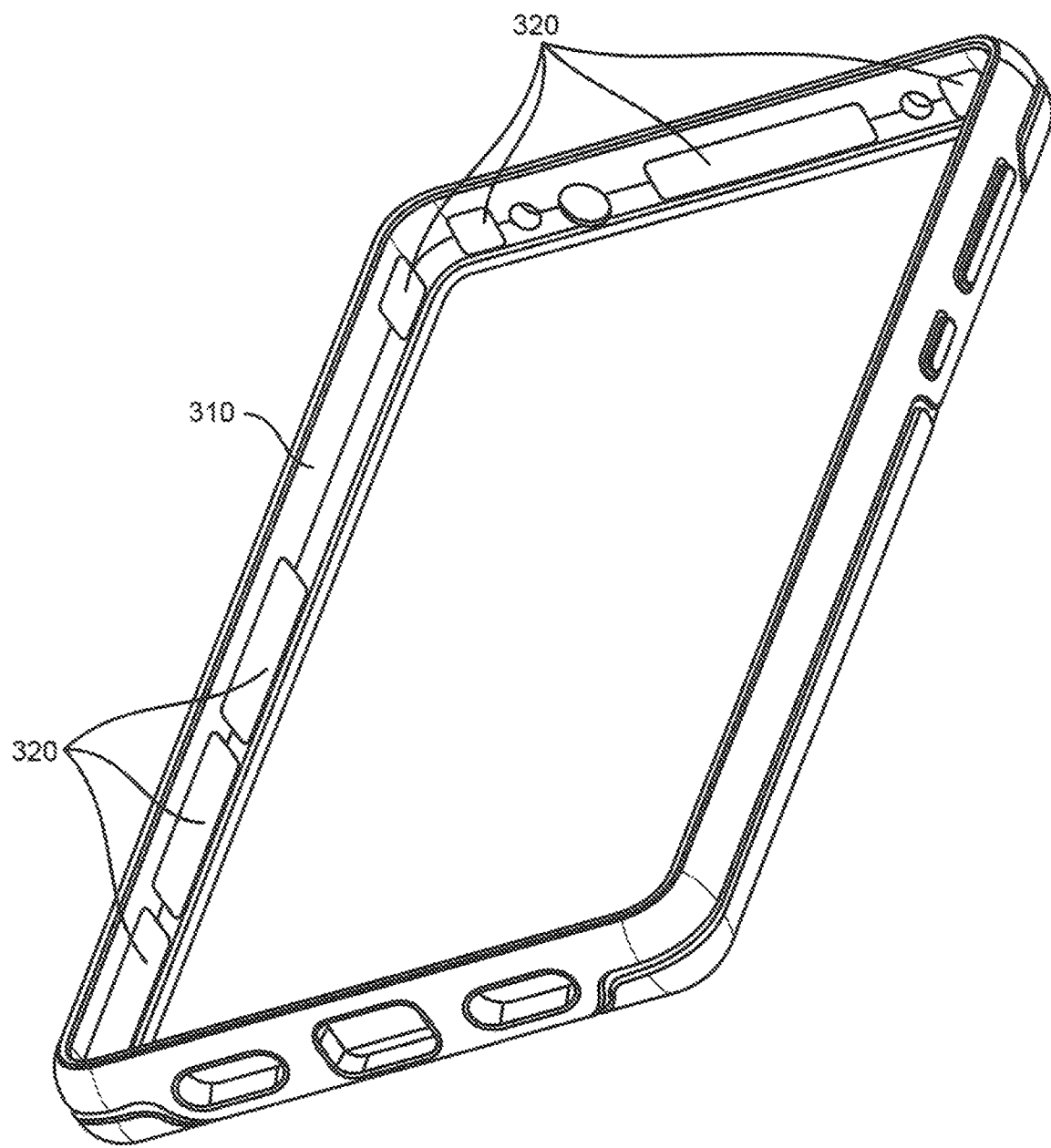
FIG. 3 illustrates a protective case.

FIG. 3 illustrates a protective case 310. Protective case 310 may have any of the features, functions, characteristics, or elements of any of protective cases 110 and 210. The techniques disclosed herein are not to be limited to any particular type, structure, or configuration of case. Protective case 310 includes one or more pieces of vinyl 320 attached to one or more interior surfaces of walls of protective case 310. Vinyl 320 may be a single piece of material or multiple pieces of material and may be present on any of the walls of protective case 310. An electronic device is inserted into protective case 310 by pressing it into the front opening of the case. Contact between one or more sides of the electronic device and vinyl 320 tends to keep the electronic device from easily falling or sliding out of protective case 310 by preventing or reducing the possibility of sheer sliding movement of electronic device 100. Vinyl 320 may be adhered to protective case 310 or may be molded or comolded into or onto protective case 310.

Figure 4A:
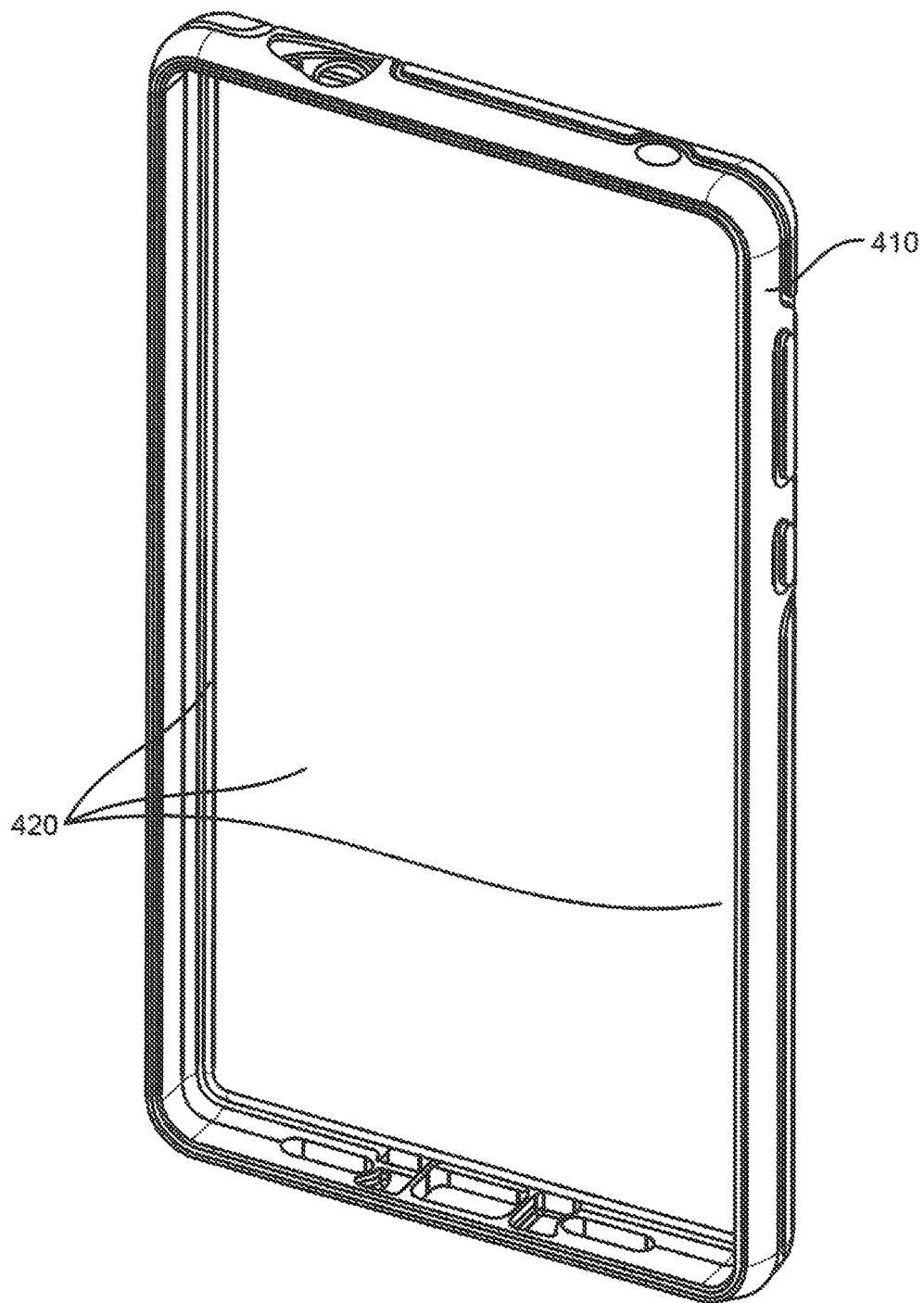
FIG. 4A illustrates a protective case.
Figure 4B:
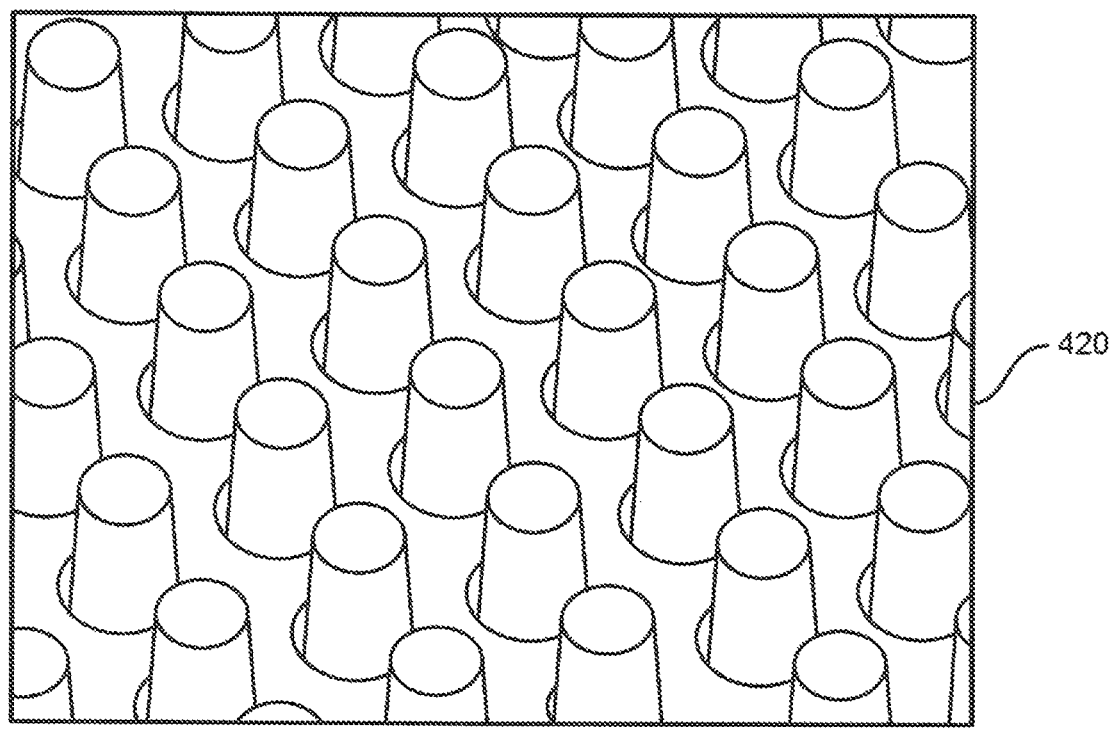
FIG. 4B illustrates a close up view of a portion of the protective case of FIG. 4A.

FIG. 4A illustrates a protective case 410. Protective case 410 may have any of the features, functions, characteristics, or elements of any of protective cases 110, 210, and 310. The techniques disclosed herein are not to be limited to any particular type, structure, or configuration of case. Protective case 410 includes one or more pieces of grip material 420 attached to one or more interior surfaces of walls of protective case 410, including on the internal back surface of protective case 410. Grip material 420 may be any material or material structure have surface features that tend to increase grip or friction with a device that comes into contact. FIG. 4B illustrates a close-up view of a surface structure of grip material 420. Other structures are possible.

Grip material 420 may be a single piece of material or multiple pieces of material. An electronic device is inserted into protective case 410 by pressing it into the front opening. Contact between one or more of the sides and back of the electronic device and grip material 420 tends to keep the electronic device from easily falling or sliding out of protective case 410 by preventing or reducing the possibility of sheer sliding of the electronic device out of the front aperture or opening. Grip material 420 may be adhered to protective case 410, may be formed onto a surface of protective case 410, or may be formed as part of protective case 410. In some cases, grip material 420 may be formed in or as part of an injection molding process. In another variation, grip material 420 may be formed in a surface of a cushioning material that is provided in protective case 410 for cushioning an installed electronic device.

Figure 5:
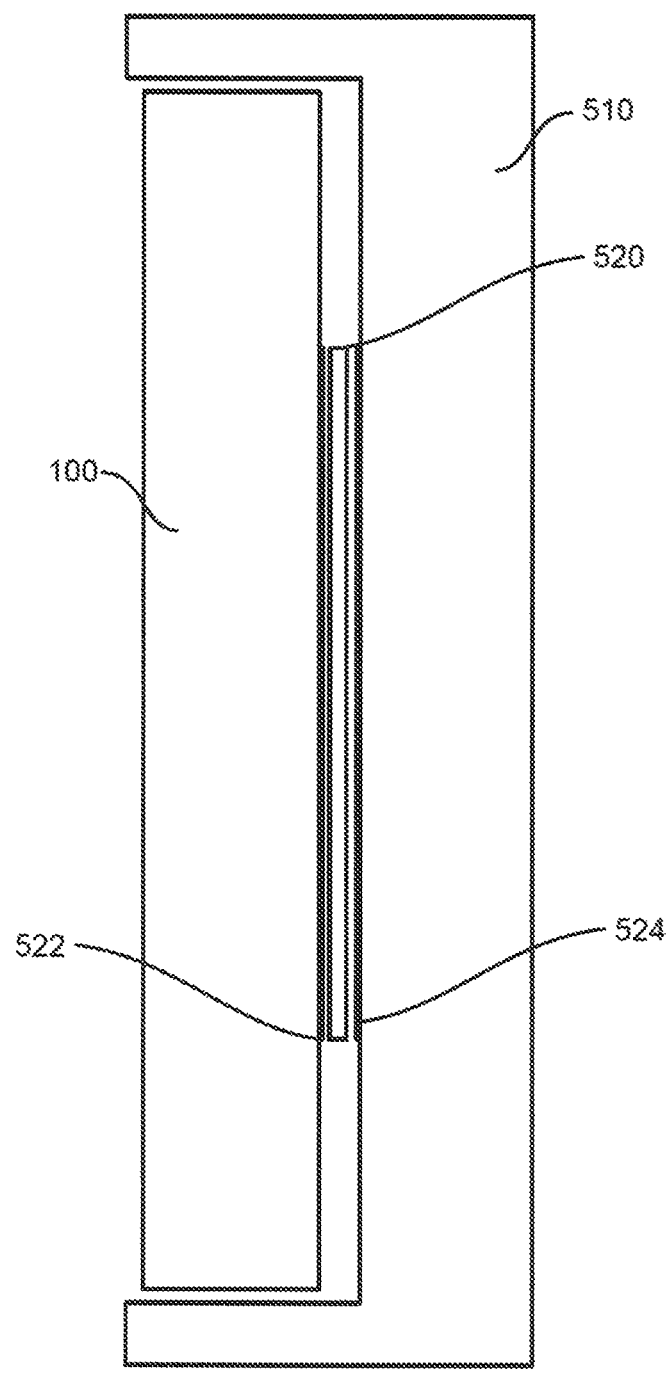
FIG. 5 illustrates the electronic device installed in a protective case.

FIG. 5 illustrates a cross section of electronic device 100 installed in a protective case 510. Protective case 510 may have any of the features, functions, characteristics, or elements of any of protective cases 110, 210, 310, and 410. The techniques disclosed herein are not to be limited to any particular type, structure, or configuration of case. It should be understood that the features and elements presented in the figures are herein are presented for purposes of explaining various concepts and may not be drawn to scale and/or in relative proportion to each other.

As illustrated in FIG. 5, protective case 510 has little or no ability to retain electronic device 100 in protective case 510 through use of a lip, finger, or edge that wraps around a front edge of electronic device 100. This may be because electronic device has little or no bezel on its front surface. Instead, a pad 520 is used to temporarily or permanently adhere electronic device 100 into protective case 510. Pad 520 is adhered or affixed to protective case 510 through first adhesive layer 524. Electronic device 510 is adhered or affixed to pad 520 through second adhesive layer 522. Each of first adhesive layer 524 and second adhesive layer 522 may comprise any one or more types of adhesives or glue. At least one of first adhesive layer 524 and second adhesive layer 524 may be semi-permanent or temporary such that electronic device 100 can be removed from protective case 510 when needed. In some situations, at least one of first adhesive layer 524 and second adhesive layer 524 may be reusable such that electronic device 100 can be replaced into protective case 510 after being removed one or more times. In other cases, at least one of first adhesive layer 524 and second adhesive layer 524 may comprise a permanent adhesive or attachment mechanism.

Figure 6:
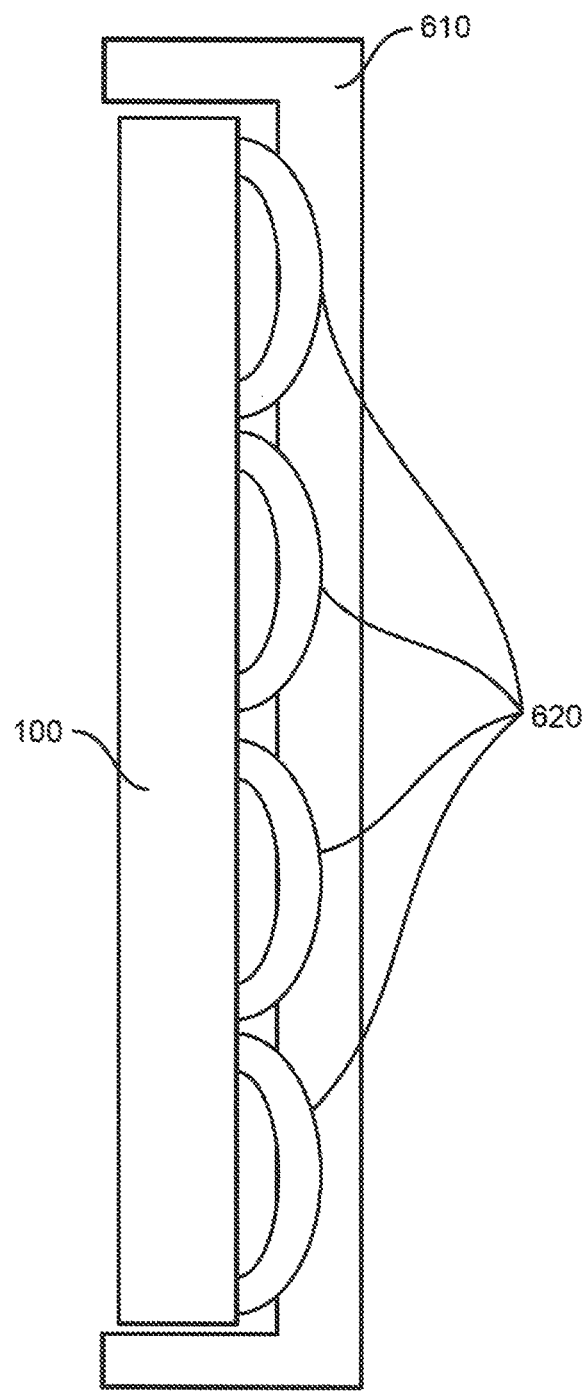
FIG. 6 illustrates the electronic device installed in a protective case.

FIG. 6 illustrates a cross section of electronic device 100 installed in a protective case 610. Protective case 610 may have any of the features, functions, characteristics, or elements of any of protective cases 110, 210, 310, 410, and 510. The techniques disclosed herein are not to be limited to any particular type, structure, or configuration of case.

As illustrated in FIG. 6, protective case 610 has little or no ability to retain electronic device 100 in protective case 610 through use of a lip, finger, or edge that wraps around a front edge of electronic device 100. Instead, one or more suction features 620, such as suction cups, may be used to removably hold electronic device 100 in protective case 610 using tensile retention force. Protective case 610 may contain any number, size, or type of suction features, including combinations thereof. While suction features 620 are relatively large in FIG. 6 for illustration purposes, they may be much smaller and may exist in greater numbers. In some situations, they may cover all of the back surface of protective case 610. In other situations, they may cover only a portion of the back surface of protective case 610. In yet other configurations, section features may be adhered or otherwise attached to the back of the electronic device.

Figure 7:
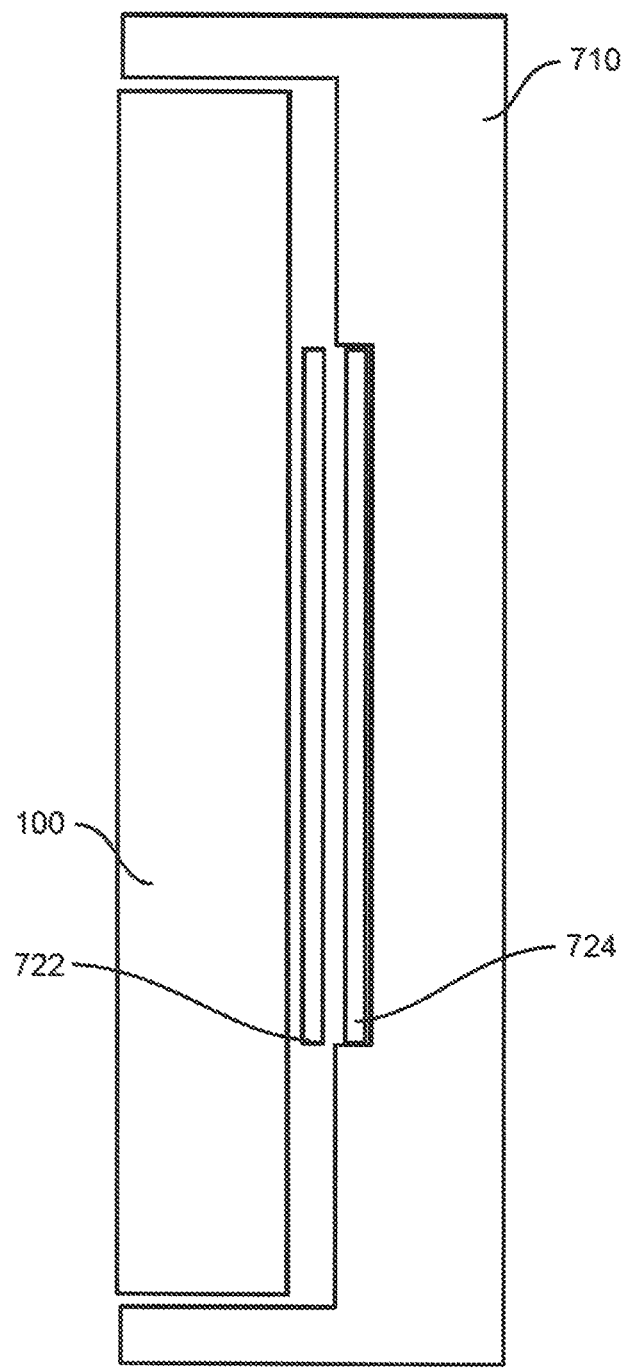
FIG. 7 illustrates the electronic device installed in a protective case.

FIG. 7 illustrates a cross section of electronic device 100 installed in a protective case 710. Protective case 710 may have any of the features, functions, characteristics, or elements of any of protective cases 110, 210, 310, 410, 510, and 610. The techniques disclosed herein are not to be limited to any particular type, structure, or configuration of case.

As illustrated in FIG. 7, protective case 710 has little or no ability to retain electronic device 100 in protective case 710 through use of a lip, finger, or edge that wraps around a front edge of electronic device 100. Instead, a first magnetic material 722 and second magnetic material 724 may be used to removably retain electronic device in protective case 710. First magnetic material 722 may be permanently or semi-permanently attached to electronic device 100 while second magnetic material 724 may be permanently or semi-permanently attached to protective case 710. One or both of first magnetic material 722 and second magnetic material 724 may be magnetized. In other words, one may be metallic while the other is actually magnetized. In one variation, protective case 710 may be made of or include a magnetic material and second magnetic material 724 may not be needed or used. In another variation, the back surface of electronic device 100 may be made of or include a magnetic material and first magnetic material 722 may not be needed or used.

Figure 8:
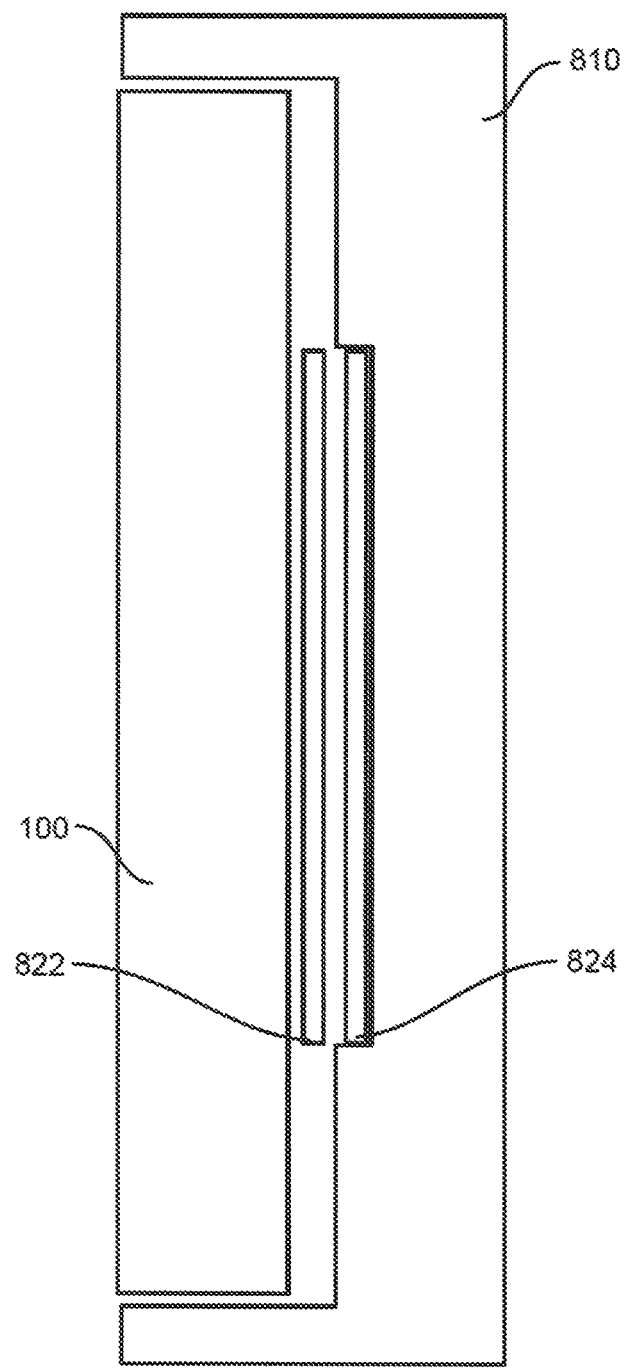
FIG. 8 illustrates the electronic device installed in a protective case.

FIG. 8 illustrates a cross section of electronic device 100 installed in a protective case 810. Protective case 810 may have any of the features, functions, characteristics, or elements of any of protective cases 110, 210, 310, 410, 510, 610, and 710. The techniques disclosed herein are not to be limited to any particular type, structure, or configuration of case.

As illustrated in FIG. 8, protective case 810 has little or no ability to retain electronic device 100 in protective case 810 through use of a lip, finger, or edge that wraps around a front edge of electronic device 100. Instead, a first fastener material 822 and second fastener material 824 may be used to removably retain electronic device in protective case 810. First fastener material 822 may be permanently or semi-permanently attached to electronic device 100 while second fastener material 824 may be permanently or semi-permanently attached to protective case 810. First fastener 822 and second fastener material 824 may be any materials which can removably attach, adhere, or clasp to each other. In one example, first fastener material 822 and second fastener material 824 may be complementary materials, such as hook and loop fastener materials, that removably attach to each other to retain electronic device 100 in protective case 810.

Figure 9:
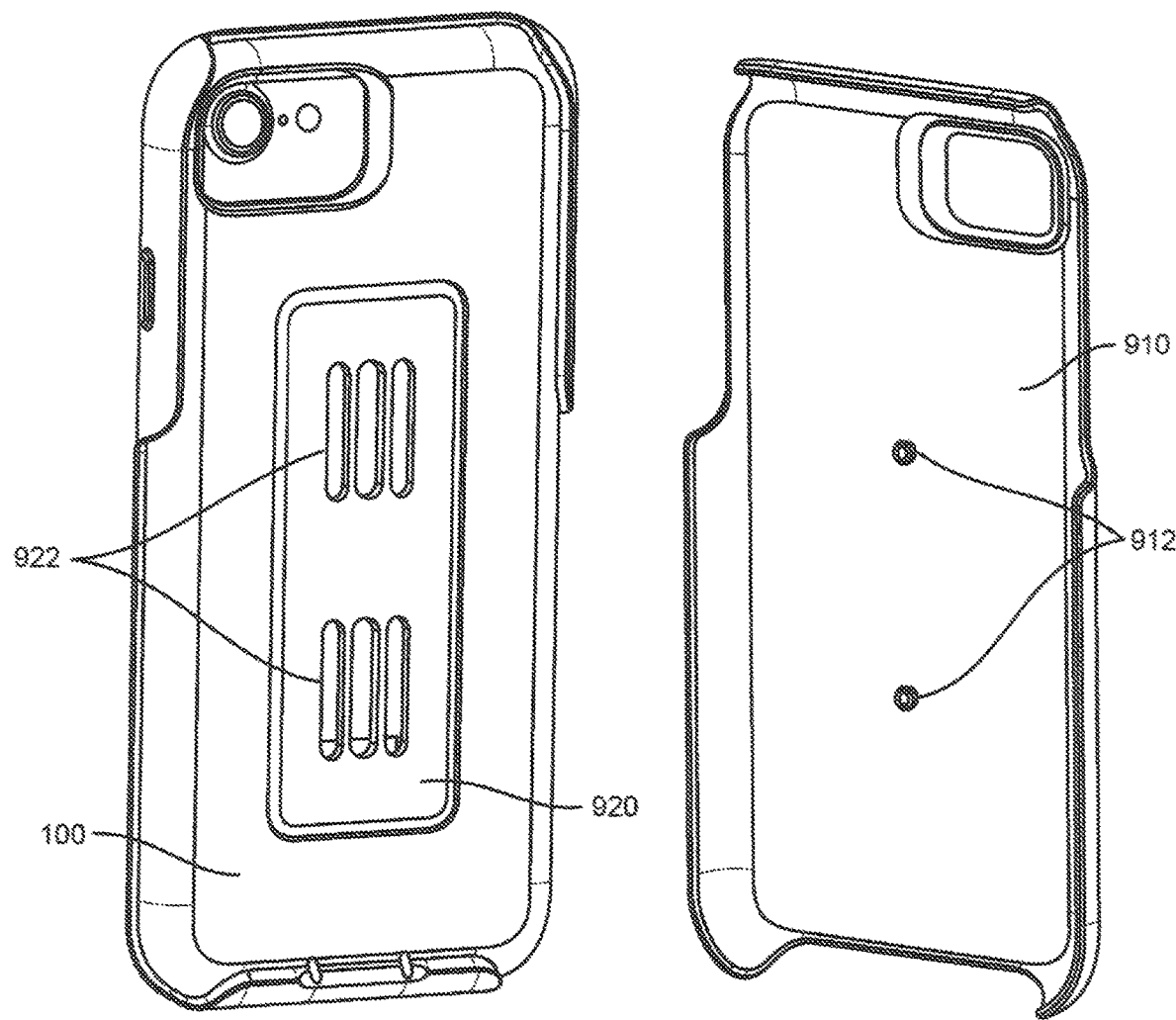
FIG. 9 illustrates a method of attaching the electronic device to a protective case.

FIG. 9 illustrates a protective case 910 that is removably attachable to electronic device 100. Protective case 910 may have any of the features, functions, characteristics, or elements of any of protective cases 110, 210, 310, 410, 510, 610, 710, and 810. The techniques disclosed herein are not to be limited to any particular type, structure, or configuration of case.

In FIG. 9, a plate 920 is attached, permanently or semi-permanently, to a back surface of electronic device 100. Plate 922 includes one or more snap features 922. Snap features 922 are complementary to and interface to one or more corresponding snap features 912 on protective case 910 for removably retaining or attaching protective case 910 to electronic device 100. Snap features 912 and/or 922 may include a friction fit and/or an interference fit.

Figure 10:
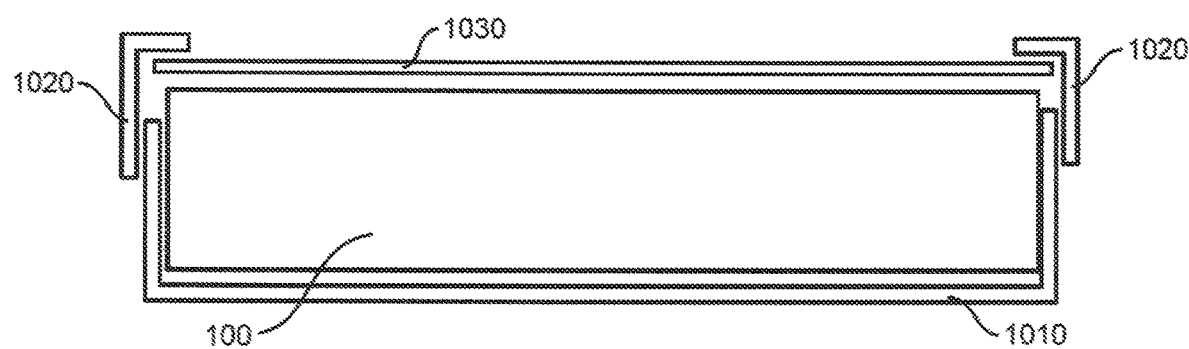
FIG. 10 illustrates an attachment mechanism for attaching the electronic device to a protective case.

FIG. 10 illustrates a cross section of electronic device 100 installed in a protective case 1010. Protective case 1010 may have any of the features, functions, characteristics, or elements of any of protective cases 110, 210, 310, 410, 510, 610, 710, 810, and 910. The techniques disclosed herein are not to be limited to any particular type, structure, or configuration of case.

As illustrated in FIG. 10, protective case 1010 has little or no ability to retain electronic device 100 in protective case 1010 through use of a lip, finger, or edge that wraps around a front edge of electronic device 100. Instead, electronic device 100 is held in protective case 1010 using a protective glass screen 1030. Protective glass screen 1030 also allows electronic device 100 to be operated and visible through protective glass screen 1030. Protective glass screen 1030 may comprise ruggedized or fortified glass. Although protective glass screen 1030 is described as 'glass,' in other examples, protective glass screen 1030 may be made of a transparent, or mostly transparent, material other than glass. Protective glass screen 1030 is held in place by a lid 1020 which extends around some or all of the perimeter of protective glass screen 1030. Lid 1020 attaches, adheres, clasps, engages, and/or snaps onto one or more clasping mechanisms or connection features on protective case 1010 and may be removable. In some configurations, protective case 1010, lid 1020, and/or protective glass 1030 may form a water-resistant or waterproof enclosure.

Figure 11:
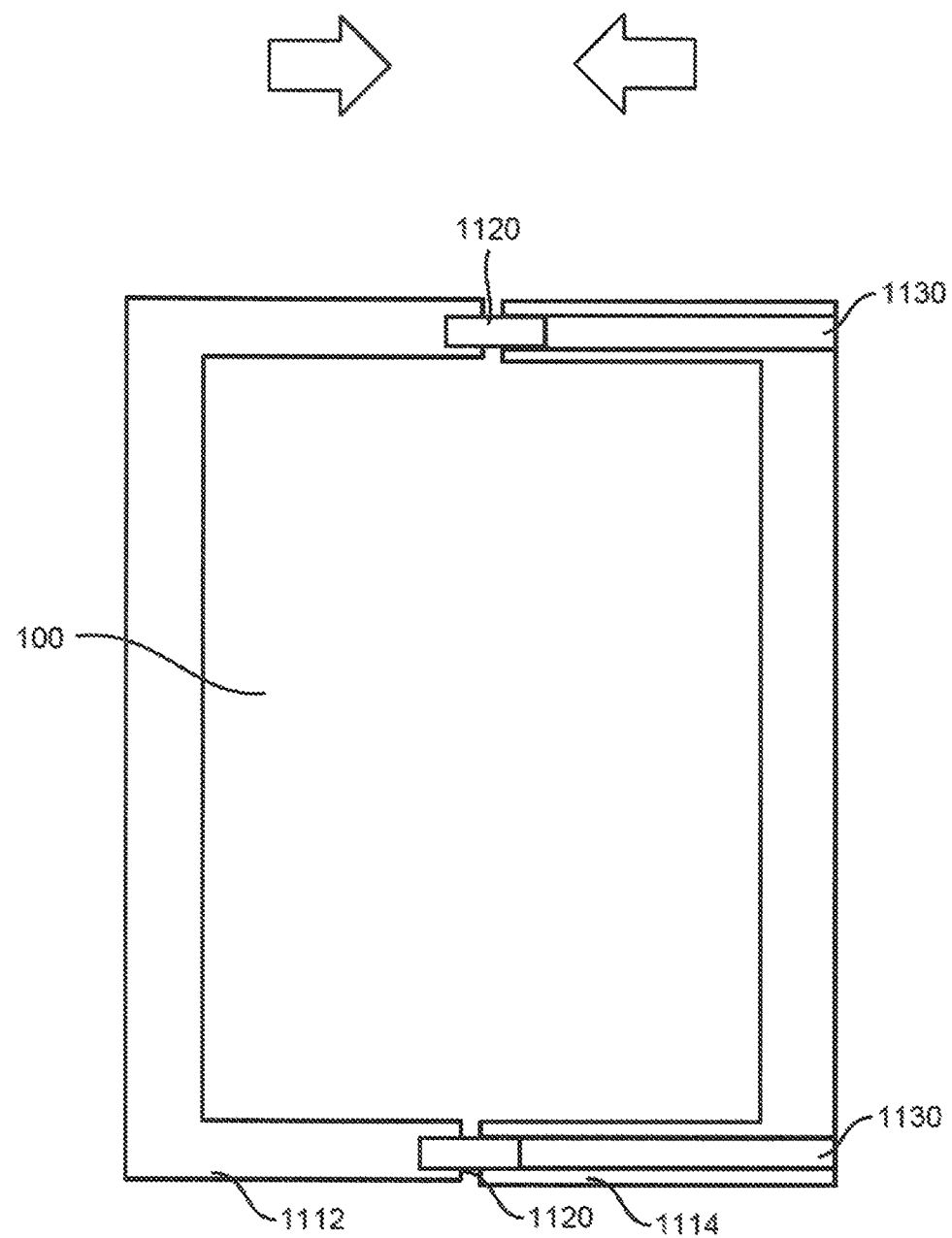
FIG. 11 illustrates the electronic device being installed in a protective case.

FIG. 11 illustrates electronic device 100 being installed in a protective case that includes a first case portion 1112 and a second case portion 1114. Protective case portions 1112 and 1114 may have any of the features, functions, characteristics, or elements of any of protective cases 110, 210, 310, 410, 510, 610, 710, 810, 910, and 1010. The techniques disclosed herein are not to be limited to any particular type, structure, or configuration of case.

As illustrated in FIG. 11, protective case portions 1112 and 1114 are installed over electronic device 100 from two opposing sides by sliding them toward each other. They hold or contain electronic device 100, substantially or completely, from the sides. Fasteners 1120 are used to removably attach case portions 1112 and 1114 together to retain and protect electronic device 100. Fasteners 1120 may each be any type of fastener, screw, clasp, snap, clasping mechanism, clip, hook, or retention device. In some examples, one of fasteners 1120 may be different or have different features than another of fasteners 1120.

Each of fasteners 1120 may be a single component or may comprise multiple components. Each of fasteners 1120 may be a separate component from case portions 1112 and 1114. Alternately, all or some portion of each of fasteners may 1120 may be a part of or may be contained in one or both of case portions 1112 and 1114. In some configurations, both case portions may contain complementary fasteners. One of the case portions, case portion 1114 in the example of FIG. 11, may contain one or more access features 1130 for accessing one or more of fasteners 1120. Access feature 1130 may be a channel, a recess, a hole, a cutout, a slot, or any feature for improving access to fastener 1120. In one example, access feature 1130 may be a recess for accessing a head of a fastener that comprises fastener 1120. Other configurations are possible.

While many examples of protective cases and method of installing or attaching them are disclosed herein, it should be understood that the features of any of the protective cases or attachment features or methods may be combined. In any of the examples, additional pads, cushions, cushioning members, compressible materials, membranes, resilient materials, tacky materials, sticky materials, and/or grippy materials may be used.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in other situations," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A protective case for use with an electronic device, the protective case comprising:
    a case portion configured to cover a back and sides of the electronic device when the electronic device is installed in the protective case, the case portion defining an aperture for directly accessing a front of the installed electronic device, the aperture having dimensions greater than or equal to corresponding dimensions of the electronic device, the case portion not including a lip or edge that extends around a front edge of the installed electronic device, the case portion including a first fastener material permanently attached to an inside back surface of the case portion; and
    a second fastener material configured to be permanently attached to the back of the electronic device at a location configured to align with the first fastener material of the case portion when the electronic device is installed in the protective case, wherein the second fastener material is configured to removably adhere to the first fastener material to removably retain the electronic device in the case portion.

2. The protective case of claim 1 wherein the first fastener material and the second fastener material comprise complementary fastening materials.

3. The protective case of claim 1 wherein the first fastener material and the second fastener material comprise hook and loop fastening materials.

4. The protective case of claim 1 wherein the case portion includes an opening configured for providing access to a camera of the installed electronic device from outside the protective case.

5. The protective case of claim 1 wherein the case portion includes an opening configured for providing access to an electrical port of the installed electronic device from outside the protective case.

6. The protective case of claim 1 wherein the case portion further includes two or more compressible pads.

7. The protective case of claim 6 wherein the compressible pads are configured to be compressed by opposing sides of the installed electronic device when the electronic device is installed in the protective case, and wherein the compressible pads are each configured to apply opposing forces to the opposing sides of the installed electronic device, respectively, to further retain the installed electronic device in the protective case.

8. The protective case of claim 6 wherein the electronic device includes one or more recesses each configured for receiving at least a portion of a respective one of the compressible pads.

9. The protective case of claim 1 wherein the case portion comprises an outer shell and an interior cushioning member.

10. A protective cover system for an electronic device, the protective cover system comprising:
- a cover portion configured to at least partially cover a back and sides of the electronic device when the electronic device is installed in the cover portion, the cover portion defining an aperture for directly accessing a front of the installed electronic device, the aperture having dimensions greater than or equal to corresponding dimensions of the electronic device;
- a first fastener material permanently attached to an inside back surface of the cover portion; and
- a second fastener material configured to be semi-permanently attached to the back of the electronic device in a position that aligns with the first fastener material of the cover portion when the electronic device is installed in the cover portion, wherein the second fastener material removably adheres to the first fastener material to removably retain the electronic device in the cover portion.

11. The protective cover system of claim 10 wherein the cover portion includes an opening configured for providing access to a camera of the installed electronic device from outside the cover portion.

12. The protective cover system of claim 10 wherein the cover portion includes an opening configured for providing access to an electrical port of the installed electronic device from outside the cover portion.

13. The protective cover system of claim 10 wherein the cover portion further includes two or more resilient compressible pads.

14. The protective cover system of claim 13 wherein the resilient compressible pads are configured to be compressed by opposing sides of the installed electronic device when the electronic device is installed in the cover portion, and wherein the resilient compressible pads are each configured to apply opposing forces to the opposing sides of the installed electronic device, respectively, to further retain the installed electronic device in the cover portion.

15. The protective cover system of claim 10 further comprising a gripping material configured to contact one or more of the back or the sides of the installed electronic device to further retain the installed electronic device in the cover portion.

16. The protective cover system of claim 10 wherein the cover portion comprises an outer shell and an interior cushioning member.

17. The protective cover system of claim 10 wherein the cover portion comprises a first cover portion removably attachable to a second cover portion.

18. A protective case for use with an electronic device, the protective case comprising:
- a protective shell adapted to at least partially cover a back and sides of the electronic device when the electronic device is installed in the protective case, the protective shell defining an aperture for directly accessing a front of the installed electronic device, the aperture having dimensions greater than or equal to corresponding dimensions of the electronic device, the protective shell including a first fastener material permanently or semi-permanently attached to an inside surface of the case portion, the protective case not extending around a front edge of the installed electronic device; and
- a second fastener material adapted to be permanently or semi-permanently attached to the electronic device in a position adapted to align with the first fastener material of the protective shell when the electronic device is installed in the case portion, wherein the second fastener material is adapted to removably adhere to the first fastener material to removably retain the electronic device in the protective shell.

19. The protective case of claim 18 wherein at least one of the first fastener material and the second fastener material includes an adhesive.

20. The protective case of claim 18 further including a cushioning liner covering at least a portion of an interior surface of the protective shell.

* * * * *